(12) United States Patent
Kim et al.

(10) Patent No.: US 7,459,507 B2
(45) Date of Patent: Dec. 2, 2008

(54) METHOD FOR THE TERMINATION OF ANIONIC POLYMERIZATION USING PHOSPHATE ESTER/WATER MIXTURE

(75) Inventors: Sam-min Kim, Daejeon (KR); Young Jin Kim, Daejeon (KR); Seung Il Kim, Daejeon (KR); Ji-Eun Ryu, Yeosu-si (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 11/746,796

(22) Filed: May 10, 2007

(65) Prior Publication Data
US 2008/0114137 A1 May 15, 2008

(30) Foreign Application Priority Data
Nov. 14, 2006 (KR) .................. 10-2006-0112422

(51) Int. Cl.
C08F 2/38 (2006.01)
C08F 297/04 (2006.01)
C08F 36/04 (2006.01)

(52) U.S. Cl. .................. 526/84; 526/173; 525/271; 528/487

(58) Field of Classification Search .......... 526/84, 526/179, 173; 528/487; 525/271
See application file for complete search history.

(56) References Cited

U.S. PATENT DOCUMENTS

| 3,534,012 A * | 10/1970 | Dennis ............ 526/181 |
| 4,415,695 A | 11/1983 | Sarkar |
| 4,857,572 A | 8/1989 | Meier et al. |
| 5,059,661 A | 10/1991 | Knobloch |
| 5,151,475 A | 9/1992 | Stevens et al. |
| 5,171,791 A | 12/1992 | Marchand et al. |
| 5,194,475 A | 3/1993 | Kruse et al. |
| 5,194,530 A | 3/1993 | Stevens et al. |
| 5,225,493 A | 7/1993 | Marchand et al. |
| 6,174,991 B1 | 1/2001 | Steiger |
| 6,489,403 B1 | 12/2002 | Halasa et al. |
| 6,767,960 B2 * | 7/2004 | Bae et al. .......... 525/53 |

FOREIGN PATENT DOCUMENTS

| KR | 0340711 | 6/2002 |
| KR | 2005-0120646 | 1/2007 |

* cited by examiner

*Primary Examiner*—Fred M Teskin
(74) *Attorney, Agent, or Firm*—Martin Fleit; Paul D. Bianco; Fleit Gibbons Gutman Bongini & Bianco PL

(57) ABSTRACT

The present invention relates to a method for terminating anionic polymerization using phosphate ester/water mixture, more particularly to a novel method for terminating anionic polymerization using phosphate ester/water mixture as a polymerization terminator in a living polymer solution prepared by the anionic polymerization, so that the polymerization can be terminated effectively, without coupling or discoloration and with less production of basic materials that affect the antioxidant, thereby enabling control of acidity without necessitating a further neutralization process.

9 Claims, No Drawings

METHOD FOR THE TERMINATION OF ANIONIC POLYMERIZATION USING PHOSPHATE ESTER/WATER MIXTURE

CROSS-REFERENCE TO RELATED APPLICATIONS

This application claims the benefit of Korean Patent Application No. 10-2006-0112422, filed on Nov. 14, 2006, the entire disclosure of which is hereby incorporated by reference.

BACKGROUND OF THE INVENTION

Homopolymers prepared by polymerization of conjugated diene monomers such as butadiene and isoprene, styrene-conjugated diene copolymer prepared by copolymerization of styrene with conjugated diene and styrene-butadiene-styrene (SBS) and styrene-isoprene-styrene (SS) block copolymers prepared by block copolymerization using organic alkali metals as anionic polymerization initiator in organic solvents have been known very useful. In particular, styrene-conjugated diene block copolymer is useful as a superior adhesive (SIS) or an asphalt modifier (SBS).

For termination of the anionic polymerization, it is essential that the active end-groups of the living polymer be removed. Such polymerization termination is accomplished by adding a coupling agent to induce coupling or by using a suitable proton-donating material, such as organic alcohol, ammonia, amine and water, which can remove the active end-groups.

In general, the organic alkali metal polymerization initiator used in anionic polymerization is a highly strong organic base and the product obtained as a result of the polymerization termination is also basic. When preparing polymer products by anionic polymerization in a commercial scale, an antioxidant is added to the polymer solution to prevent oxidation and mechanical degradation before and after solvent removal and preparation of the product. However, most of antioxidants used for the above purpose are unstable in basic conditions because they lose the ability to prevent oxidative degradation of polymers in basic conditions. Therefore, the resultant product cannot maintain stability against discoloration and aging despite the use of an antioxidant.

For example, U.S. Pat. No. 5,225,493 teaches that when a basic polymer product is heat-treated, its melt viscosity changes and haze increases, thus deteriorating transparency.

According to U.S. Pat. Nos. 4,857,572 and 5,059,661, when the active end-groups of living copolymer remain or the acidity is inappropriate, the addition of antioxidant may decrease heat resistance or discoloration of the block copolymer. The patents disclose that, because an antioxidant is very sensitive to the active end-groups of the anionic polymer and the acidity, the polymerization terminator or neutralizer, which greatly influences the acidity of the reaction mixture, serves a very important role to obtain the effect expected from the antioxidant.

U.S. Pat. No. 4,415,695 discloses that a highly stable anionic polymerization product resistant to discoloration can be obtained when boronic acid is used as a polymerization terminator. Unfortunately, however, U.S. Pat. No. 5,225,493 teaches that the use of boronic acid as a polymerization terminator increases melt viscosity after thermal aging.

To solve the above problems, U.S. Pat. Nos. 5,171,791 and 5,225,493 disclose methods of using water or alcohol as a polymerization terminator, using sulfuric acid, phosphoric acid or a mixture thereof as a neutralizer and then adding an antioxidant. However, since alcohols being used as a polymerization terminator and phosphoric acid or sulfuric acid being used as neutralizer are hardly compatible with a nonpolar hydrocarbon polymerization solvent, a quantitative termination of reaction becomes difficult. Further, excessive use of strong acid may lead to the corrosion of reaction apparatuses and overall acidity control is difficult.

U.S. Pat. No. 6,174,991 B1 proposes new polymerization terminator and antioxidant in order to solve the stability problem of an antioxidant in anionic polymerization. This patent uses neodecanoic acid as a polymerization terminator and uses citric acid as a neutralizer. The polymerization terminator used in the patent is expressed by the general formula RCO2H, where R is defined as C3-C30. The organic acid is recovered during the solvent removal process using steam following the polymerization termination and usually remains in the polymer, giving off offensive odor, or remains in water, generating wastewater. Or, it contaminates the polymerization solvent, as disclosed in U.S. Pat. No. 6,489,403.

U.S. Pat. No. 5,151,475 proposes a variety of polymerization terminators. Generally, the problem of polymerization termination following the anionic polymerization is solved by using alcohol. However, the above patent describes that the use of alcohol leads to the production of alkali metal oxides and excessive alcohol impurities. Alcohols and alkali metal oxides remaining in the polymerization reactor remove the active end-groups of living polymers and make the molecular weight control during the subsequent reactions difficult. And, in case methanol is used as a polymerization terminator, most of the methanol has to be discarded during the solvent recovery process. A large amount of waste is produced in this process. Therefore, a novel method capable of removing the active end-groups of living polymers without producing alkali metal oxides or using excess alcohol is required. Several organic compounds capable of reacting with living anions have been patented as a new way of polymerization termination.

However, borane compounds, ammonia and cyclopentadiene are disadvantageous in that coupled compounds are generated in excess and a neutralizer is required. When chlorine is used, the amount of coupled polymers can be reduced, but it has a drawback that it causes the reactor to be corroded.

U.S. Pat. No. 5,194,530 proposes several organic compounds having active protons that can react with anions as a polymerization terminator for removing the active end-groups after the anionic polymerization. But, they do not solve the coupling problem of U.S. Pat. No. 5,194,475 and need neutralizers like alcohols. And, since the compounds are recovered to the original state by neutralization during the solvent recovery process, they have to be removed through a separate process.

Korean Patent No. 0340711 discloses a method of using phosphate ester alone as anionic polymerization. However, since a large amount of phosphate ester has to be used, the phosphate ester may remain in the polymer or water after the solvent removal using steam, resulting in generation of wastewater or contamination of the polymerization solvent. If the amount of the phosphate ester remaining in the polymer increases, the product may become less transparent and less heat-resistant. Further, excessive addition of the phosphate ester may interrupt the dispersion of polymers during the process of removing the solvent, thereby generating large lumps of polymers.

Korean Patent Application No. 2005-0120646 presents a method of removing the active end-groups of anionic polymer by directly adding a small amount of water. However, since water is not mixed well with nonpolar hydrocarbon solvents, the ability of polymerization termination may decline significantly. In addition, when used in excess, it may act as catalytic poison, remaining in the reactor.

DETAILED DESCRIPTION OF THE INVENTION

The present invention relates to a method for terminating anionic polymerization using a phosphate ester/water mixture. More particularly, the present invention relates to a novel method for terminating anionic polymerization using phosphate ester/water mixture as a polymerization terminator in a living polymer solution prepared by the anionic polymerization, so that the polymerization can be effectively terminated without coupling or discoloration and also with less production of basic materials that affect the antioxidant, thereby enabling control of acidity without a further neutralization process.

The present inventors have made much efforts to solve the problems of the removal of active end-groups of polymers following anionic polymerization, neutralization of base, which affects the oxidation preventing ability of antioxidant used to improve color and stability of polymers, generation of wastewater during the solvent removal following the removal of active end-groups and neutralization processes and remaining of polymerization terminator in the recovered solvent. As a result, they completed the present invention by developing a method for terminating anionic polymerization using phosphate ester/water mixture with a specific mixing ratio as effective and environment-friendly polymerization terminator, which improves the stability of the resulting polymer.

Accordingly, an object of the present invention is to provide a method for terminating anionic polymerization that improves the stability or conjugated diene polymer prepared by anionic polymerization using phosphate ester/water mixture as an effective and environment-friendly polymerization terminator.

The present invention relates to a method for terminating anionic polymerization in the preparation of conjugated diene polymer using an organic alkali metal compound as anionic polymerization initiator in which phosphate ester/water mixture is used as a polymerization terminator.

Hereunder is given a more detailed description of the present invention.

The present invention relates to a novel method for the termination of polymerization using phosphate ester/water mixture as a polymerization terminator in the living polymer solution prepared by anionic polymerization, which provides effective termination of polymerization without coupling or discoloration and results in less production of basic materials that negatively affect the antioxidant, thereby enabling control of acidity without further neutralization process.

The present invention is characterized in that, in preparing an anionic polymer using an organic alkali metal compound as anionic polymerization initiator in the presence of a nonpolar hydrocarbon solvent, the active end-groups of polymers selected from homopolymer polymerized from conjugated diene monomers, conjugated diene copolymers copolymerized from conjugated diene monomer, vinyl aromatic-conjugated diene copolymers copolymerized from vinyl aromatic monomer and conjugated diene monomers, and a block copolymer block copolymerized from a vinyl aromatic monomer and a conjugated diene monomer, are removed by Lewis acid.

The anionic polymerization initiator used in the present invention may be any organic alkali metal compound, but it is preferable to use an organic lithium compound. The organic lithium compound is expressed by the general formula RLi and has the ability of initiating polymerization. The organic lithium compound may be one commonly used for anionic polymerization, wherein R is C1-C20 alkyl, cycloalkyl, aryl, etc. More preferably, the organic lithium initiator may be n-butyllithium, sec-butyllithium, methyllithium, ethyllithium, isopropyllithium, cyclohexyllithium, allyllithium, vinyllithium, phenyllithium, benzyllithium etc.

The vinyl aromatic monomer used in the present invention may be at least one selected from styrene, α-methylstyrene, o-methylstyrene, p-methylstyrene, p-tert-butylstyrene 1,3-dimethylstyrene, alkoxy-substituted styrene, 2-vinylpyridine, 4-vinylpyridine, vinylnaphthalene and alkyl-substituted vinylnaphthalene, more preferably styrene.

The conjugated diene monomer used in the present invention may be C4-C12 anion polymerizable conjugated diene such as 1,3-butadiene, isoprene, piperylene, methylpentadiene, phenylbutadiene, 3,4-dimethyl-1,3-hexadiene, 4,5-diethyl-1,3-octadiene, etc.

Each stage of the polymerization may be performed at the same or different temperature, under constant-temperature or adiabatic condition. The reaction may be performed at a temperature of from −10 to 150° C., preferably from 10 to 100° C.

The polymerization terminator used in the present invention is a solution prepared by dissolving a mixture of phosphate ester and water in a nonpolar hydrocarbon solvent.

The nonpolar hydrocarbon solvent may be one commonly used in anionic polymerization. More specifically, cyclic aliphatic hydrocarbons such as cyclopentane, cyclohexane, cycloheptane, etc., alkyl-substituted aromatic hydrocarbons such as benzene, naphthalene, toluene, xylene, etc., linear or branched aliphatic hydrocarbon solvents such as pentane, hexane, heptane, octane, etc. may be used. Preferably, cyclohexane, n-hexane or n-heptane may be used alone or in combination.

Preferably, the phosphate ester used in the present invention is a mixture of the mixture 1 (hereinafter referred to as KPSS2000) and the mixture 2 (hereinafter referred to as KPSS1000), wherein the mixture 1 is a mixture of the compound represented by the formula (1) and the compound represented by the formula (2) below, while the mixture 2 is a mixture of the compound represented by the formula (3) and the compound represented by the formula (4) below. The phosphate ester mixture is mixed with water and then dissolved in a nonpolar hydrocarbon solvent before use.

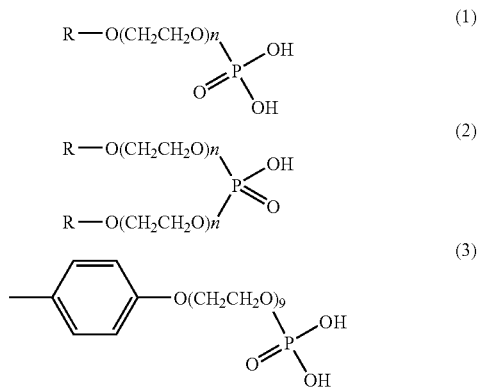

-continued

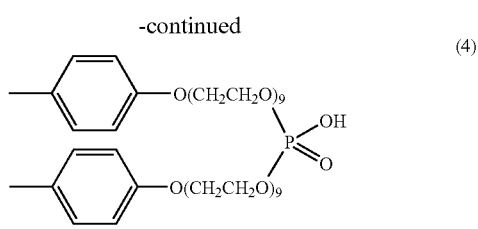

(4)

In the formulas (1) to (4), R is a hydrogen atom or a $C_1$-$C_{20}$ alkyl.

Typical properties of the phosphate ester are summarized in Table 1 below:

TABLE 1

| Category | KPSS2000 | KPSS1000 |
|---|---|---|
| Molecular weight (g/mol) | 300-1000 | 500-1500 |
| Acid value | 1.2-1.9 | 1.2-1.9 |
| Solubility to CHX | > | |
| to $H_2O$ | < | |
| Chance to remain in polymer | > | |

Especially, the mixture 1 (KPSS2000) is preferably used in the amount of 0.1-10 times the weight of the mixture 2 (KPSS1000). If the content is either above or below this range, the polymerization terminator system becomes unstable, thus leading to phase separation. The mixture 1 is obtained by mixing the compound represented by the formula (1) with the compound represented by the formula (2) in a weight ratio of 1:0.2-5. The mixture 2 is obtained by mixing the compound represented by the formula (3) with the compound represented by the formula (4) in a weight ratio of 1:0.2-5.

The polymerization terminator of the present invention may be, for example, used to prepare polybutadiene from butadiene monomer, polyisoprene from isoprene monomer, butadiene-isoprene copolymer from butadiene and isoprene, styrene-butadiene copolymer from styrene and butadiene, styrene-isoprene copolymer from styrene and isoprene, styrene-butadiene-styrene block copolymer from styrene and butadiene, styrene-butadiene-isoprene copolymer from styrene, butadiene and isoprene and styrene-isoprene-styrene block copolymer from styrene-isoprene.

Besides, the phosphate ester/water mixture, or the polymerization terminator used in the present invention, is preferably mixed in a ratio of 1:0.1-10 based on weight. If the content is either above or below this range, the polymerization terminator system becomes unstable, thus resulting in phase separation, or the phosphate ester mixture may remain in the polymer.

The present invention is described in detail taking styrene-butadiene-styrene block copolymer as an example. However, the example only provides an embodiment of the present invention and shall not be limited to the example. Styrene monomer is added to a nonpolar hydrocarbon solvent in the presence of an organic lithium initiator to prepare a living polystyrene polymer. To the resultant living polystyrene polymer are added butadiene monomers to obtain a diblock living copolymer. Subsequently, coupling may be performed by adding a coupling agent or styrene monomers may be further added to prepare a triblock living copolymer. During the polymerization termination following the completion of the coupling or during the polymerization termination of the triblock copolymerization by further adding styrene monomer, the aforementioned polymerization terminator is added in equivalent moles of active anions, so that polymerization termination and neutralization are accomplished at the same time. After the addition of adequate antioxidant, the solvent is recovered to complete the preparation of polymer.

Two kinds of techniques were used to analyze the polymerization termination capacity of the polymerization terminator of the present invention.

The first technique is a qualitative one in which, following the polymerization termination, styrene is further added to the polymer after the polymerization terminator has been added to the living polymer solution. If the living polymer remains active and polymerization of styrene occurs, the polymer solution will turn to dark orange, the characteristic color of the living polystyrene. The second technique of analyzing the polymerization termination capacity is a quantitative one using gel permeation chromatography (GPC). If polymerization termination is incomplete, the GPC analysis will not give the large-molecular-weight peak in the chromatogram.

To obtain a quantitative analysis result, the coupling ratio was determined in the present invention. The polymerization termination capacity of the novel polymerization terminator of the present invention was compared with that of other polymerization terminators. Polymerization terminator was added to a polymer solution prepared by adding organic lithium to polymerizable monomers. After stirring for 10 minutes, the polymer solution was exposed to air and the coupling ratio of active end-groups was measured by GPC. The coupling ratio was calculated by dividing the coupled area by the total area.

Preferably, the polymerization terminator in accordance with the present invention is used in the amount of 0.5-20 equivalents based on the moles of the total active anions (moles of the polymerization initiator used). If the polymerization terminator is used less than 0.5 equivalent, the termination of polymerization may not be completed. In contrast, if it is used in excess of 20 equivalents, the polymerization terminator may remain in the reactor and act as catalytic poison in the subsequent reactions.

Since the novel polymerization terminator comprising phosphate ester used in the present invention has good solubility in a nonpolar solvent, it can effectively remove the active end-groups of anionic polymerized polymer in a nonpolar solvent and adequately control the acidity (pH) of the polymer.

BEST MODE FOR CARRYING OUT THE INVENTION

Practical and preferred embodiments of the present invention are illustrated as shown in the following examples. However, it will be appreciated that those skilled in the art may, in consideration of this disclosure, make modifications and improvements within the spirit and scope of the present invention.

EXAMPLE 1

Polymerization Termination of Styrene-Butadiene Block Copolymer using KPSS2000/KPSS1000/$H_2O$ (1:1:1) Mixture The inside of a 2 L high-pressure reactor was sufficiently substituted with argon gas. Then, 900 g of purified cyclohexane, 0.2 mL of tetrahydrofuran and 40 g of styrene were added thereto and the temperature was maintained at 50° C. n-Butyllithium (BuLi) 2 mmol cyclohexane solution (1.3 M) was added to the reactor as an initiator to initiate polymerization. 120 g of butadiene was added 10 minutes after the polymerization temperature reached the maximum. Then, 40 g of styrene was further added 5 minutes after the butadiene polymerization temperature reached the maximum. 0.5 part by weight of 25 wt % KPSS2000/KPSS1000/$H_2O$ (1:1:1, based on weight) mixture was added to the reactor 5 minutes after the styrene polymerization temperature reached the maximum to terminate the polymerization. After the termination of polymerization, 5 g of styrene was further added to find out the degree of the removal of active end-groups. The coupling ratio of the resultant polymer and the color of the polymer solution after the further addition of styrene following the polymerization termination are given in Table 2. To the resultant polymer solution were added 0.4 part by weight of Songnox 1076 and 0.4 part by weight of Irgafos 168 as an antioxidant. Then, the solvent was removed using steam to obtain a styrene-butadiene block copolymer having styrene-butadiene-styrene blocks in the form of a crumb. The resultant rubber crumb was dried in a roll mill at 120° C. to obtain 2 mm-thick sheet, which was cut to a size of about 5 cm×5 cm×2 mm to prepare a sample for testing thermal aging. The sample was thermally aged in an oven at 160° C. for 2 hours with 30 minute intervals while checking the color and the degree of thermal aging. The result is given in Table 3 below.

EXAMPLE 2

The procedure of Example 1 was repeated, except that 0.5 part by weight of 25 wt % KPSS2000/KPSS1000/$H_2O$ (2:1:1, based on weight) mixture was added to the reactor as a polymerization terminator to terminate the polymerization. To the resultant polymer solution were added 0.4 part by weight of Songnox 1076 and 0.4 part by weight of Irgafos 168 as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

EXAMPLE 3

The procedure of Example 1 was repeated, except that 0.6 part by weight of Songnox 1076 and 0.2 part by weight of 0.2 parts by weight of 2,4-bis[(octylthio)methyl]-o-cresol [Irganox 1520, Ciba Specialty Chemicals] as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

EXAMPLE 4

The procedure of Example 1 was repeated, except that 0.5 part by weight of 25 wt % KPSS2000/KPSS1000/$H_2O$ (1:2:1, based on weight) mixture was added to the reactor as a polymerization terminator to terminate the polymerization. To the resultant polymer solution were added 0.6 part by weight of Songnox 1076 and 0.2 part by weight of 2,4-bis[(octylthio)methyl]-o-cresol [Irganox 1520, Ciba Specialty Chemicals] as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

Comparative Example 1

The procedure of Example 1 was repeated, except that 2 mmol of water was used as a polymerization terminator and 0.4 part by weight of Songnox 1076 and 0.4 part by weight of Irgafos 168 were used as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

Comparative Example 2

The procedure of Example 1 was repeated, except that 2 mmol of methanol was used as a polymerization terminator and 0.4 part by weight of Songnox 1076 and 0.4 part by weight of Irgafos 168 were used as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

Comparative Example 3

The procedure of Example 1 was repeated, except that 0.5 part by weight of KPSS2000 phosphate ester was used as a polymerization terminator and 0.4 part by weight of Songnox 1076 and 0.4 part by weight of Irgafos 168 were used as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

Comparative Example 4

The procedure of Example 1 was repeated, except that 0.5 part by weight of KPSS1000 phosphate ester was used as a polymerization terminator and 0.4 part by weight of Songnox 1076 and 0.4 part by weight of Irgafos 168 were used as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

Comparative Example 5

The procedure of Example 1 was repeated, except that 2 mmol of water was used as a polymerization terminator and 0.6 part by weight of Songnox 1076 and 0.2 part by weight of 2,4-bis[(octylthio)methyl]-o-cresol [Irganox 1520, Ciba Specialty Chemicals] were used as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

Comparative Example 6

The procedure of Example 1 was repeated, except that 2 mmol of methanol was used as a polymerization terminator and 0.6 part by weight of Songnox 1076 and 0.2 part by weight of Irganox 1520 were used as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

Comparative Example 7

The procedure of Example 1 was repeated, except that 2 mmol of KPSS2000 phosphate ester was used as a polymerization terminator and 0.6 part by weight of Songnox 1076 and 0.2 part by weight of Irganox 1520 were used as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

Comparative Example 8

The procedure of Example 1 was repeated, except that 2 mmol of KPSS1000 phosphate ester was used as a polymerization terminator and 0.6 part by weight of Songnox 1076 and 0.2 part by weight of Irganox 1520 were used as an antioxidant. Rubber crumb was obtained and a sample for thermal aging test was prepared. The color and the degree of thermal aging of the sample are given in Table 3. The coupling ratios and the colors of the polymer solutions after the further addition of styrene upon termination of the polymerization are given in Table 2.

TABLE 2

| Category | Coupling ratio (%) | Transparency | Color |
|---|---|---|---|
| Example 1 | 2.4 | transparent | colorless |
| Example 2 | 2.5 | transparent | colorless |
| Example 3 | 2.3 | transparent | colorless |
| Example 4 | 2.4 | transparent | colorless |
| Comp. Ex. 1 | 5.2 | transparent | colorless |
| Comp. Ex. 2 | 4.2 | transparent | colorless |
| Comp. Ex. 3 | 3.2 | opaque | colorless |
| Comp. Ex. 4 | 2.8 | opaque | colorless |
| Comp. Ex. 5 | 5.3 | transparent | colorless |
| Comp. Ex. 6 | 4.1 | transparent | colorless |
| Comp. Ex. 7 | 3.1 | opaque | colorless |
| Comp. Ex. 8 | 2.8 | opaque | colorless |

As seen in Table 2, the coupling ratios in Examples 1-4 were lower than those in the Comparative Examples. The high coupling ratios in Comparative Examples 1 and 5 are speculated to have been caused by the increased coupling and the interrupted mixing with the reaction solvent due to the oxygen dissolved in water. In Comparative Examples 3, 4, 7 and 8, wherein mixing with the solvent was effective, good polymerization termination capacity was shown, but little increase in coupling ratio was shown due to the large amount of addition. The polymer solutions in Examples 1-4 showed better polymerization termination capacity than those of the Comparative Examples. Further, when the phosphate ester was used alone, the excessive use of the polymerization terminator decreased the transparency of the polymer solutions.

TABLE 3

| Category | | Example 1 | Example 2 | Comp. Ex. 1 | Comp. Ex. 2 | Comp. Ex. 3 | Comp. Ex. 4 |
|---|---|---|---|---|---|---|---|
| Reaction terminator | | KPSS2000/ KPSS1000/ water | KPSS2000/ KPSS1000/ water | water | methanol | KPSS2000 | KPSS1000 |
| Antioxidant | | Songnox 1076/ Irgafos 168 | Songnox 1076/ Irgafos 168 | Songnox 1076/ Irgafos 168 | Songnox 1076/ Irgafos 168 | Songnox 1076/ Irgafos 168 | Songnox 1076/ Irgafos 168 |
| Color grade after thermal aging[a] | 0 min | A | A | A | A | A | A |
| | 30 min | A | A | A | A | B | B |
| | 60 min | A | B | B | B | C | C |
| | 90 min | B | B | C | C | D | DC |
| Gel content grade after thermal aging | 0 min | A | A | A | A | A | A |
| | 30 min | A | A | B | A | B | B |
| | 60 min | A | B | B | B | C | C |
| | 90 min | B | B | C | C | C | D |

| Category | | Example 3 | Example 4 | Comp. Ex. 5 | Comp. Ex. 6 | Comp. Ex. 7 | Comp. Ex. 8 |
|---|---|---|---|---|---|---|---|
| Reaction terminator | | KPSS2000/ KPSS1000/ water | KPSS2000/ KPSS1000/ water | water | methanol | KPSS2000 | KPSS1000 |
| Antioxidant | | Songnox 1076/ Irgafos 1520 | Songnox 1076/ Irgafos 1520 | Songnox 1076/ Irgafos 1520 | Songnox 1076/ Irgafos 1520 | Songnox 1076/ Irgafos 1520 | Songnox 1076/ Irgafos 1520 |
| Color grade after thermal aging[b] | 0 min | A | A | B | B | A | A |
| | 30 min | A | A | C | C | B | B |
| | 60 min | B | B | D | D | B | C |
| | 90 min | B | C | E | E | C | D |
| Gel content grade after thermal aging | 0 min | A | A | A | A | A | A |
| | 30 min | B | B | C | C | B | C |
| | 60 min | B | B | D | D | B | C |
| | 90 min | C | C | E | E | C | D |

[a] The color grade was examined under naked eyes (colorless = good, dark color = poor). A: very good, B: good, C: average, D: poor, E: very poor

[b] 5 g of sample was dissolved in 200 mL of xylene and filtered through No. 2 filter paper. The filter paper was stained with Solvent Blue 35 solution. Gel content grade was determined by counting or weighing gels. A: none, B: 1-2, C: 3-10. D: less than 20 mg, E: 20 mg or more The rubbers prepared in Examples 1-4 and Comparative Examples 1-8 had a weight-average molecular weight of about 60,000. The total amount of the antioxidant used was identical to be 0.8 part by weight, but the heat resistance of rubbers varied greatly.

The polymer solutions in Examples 1 and 2 showed the most superior discoloration resistance and heat resistance. The polymer solutions in Examples 3 and 4, in which pH-sensitive antioxidant Irganox 1520 was used, also showed stable activities. The polymer solutions in Comparative Examples 1 and 2 showed average discoloration resistance and heat resistance. The polymer solutions in Comparative Examples 5 and 6 showed poor initial rubber color, heat resistance and discoloration because lithium oxide remaining in the rubber reacts with dimer impurities included in Irganox 1520. The polymer solutions in Comparative Examples 3, 4, 7 and 8, in which only the phosphate ester was used, showed average discoloration resistance and heat resistance. However, because much phosphate ester has to be used, the polymer solution becomes opaque, thus decreasing the transparency of the polymer solution. Further, since most of the phosphate ester or lithium salt of the phosphate ester remain in the polymer, the heat resistance becomes poor.

Experimental Example 1

In order to measure the transparency of the rubber, the rubber crumbs prepared in Example 1 and Comparative Examples 1, 2, 3 and 4 were dried in a roll mill and prepared into 15 cm×15 cm×2 mm press sheets under the condition of 160° C. and 100 kgf/cm$^2$.

Experimental Example 2

In order to measure the effects of rubber color, heat resistance and transparency on the physical properties of heat-melt adhesive, the rubber crumbs prepared in Example 1 and Comparative Examples 1, 2, 3 and 4 were dried in a roll mill and prepared into about 0.5 mm-thick sheets. They were cut to rubber chips with a size of about 0.5 cm×0.5 cm×0.5 mm. Heat-melt adhesives were prepared by the rubber chips and color and transparency were compared.

Preparation of the heat-melt adhesive was performed by the method commonly employed in the related art. 50 g of the rubber chip was put in a stainless container along with 10 g of adhesive resin, 39 g of oil and 1 g of an antioxidant. The adhesive was prepared by heat melting for 3 hours using a stirrer, while maintaining the temperature at 160° C. To minimize thermal aging at high temperature, the reaction system was maintained under nitrogen atmosphere.

TABLE 4

| Category | | Example 1 | Comp. Ex. 1 | Comp. Ex. 2 | Comp. Ex. 3 | Comp. Ex. 4 |
|---|---|---|---|---|---|---|
| Rubber press sheets | Transparency | A | A | A | B | B |
| Adhesives | Transparency | A | A | A | C | B |
| | Color | B | C | C | D | C |

Transparency of adhesives was evaluated by pouring melt adhesive in a 5 cm × 5 cm bottle.
Transparency was evaluated with eyes (A: good, B: average, C: poor).
Color of adhesives was evaluated by the color grade of Table 1.

As seen in Table 4, both the rubber transparency and adhesive transparency were superior and adhesive color was also good in Example 1.

In contrast, while rubber transparency and adhesive transparency were superior in Comparative Examples 1 and 2, adhesive color remained at an average level. In Comparative Examples 3 and 4, rubber transparency was on an average level, but adhesive transparency and color was very poor, because of the excessive phosphate ester used as a reaction terminator.

As seen in Table 3 and Table 4, the polymer prepared in accordance with the present invention is shown to have superiorities in initial rubber color, heat resistance, transparency and adhesive color and transparency.

As apparent from the above description, the present invention provides a novel method for the termination of polymerization without discoloration or generation of basic materials that negatively affect antioxidant, which enables effective acidity control without further neutralization process, using phosphate ester/water mixture as a polymerization terminator in anionic polymerization. The resultant polymer has superior color and heat resistance and, thus, is suitable for the use as heat-melt adhesive and plastic modifier. Especially, it is adequate from asphalt modification and compounding, particularly in the manufacture of impact-resistant polystyrene resin and polystyrene sheet.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

What is claimed is:

1. A method for terminating anionic polymerization, in the course of preparing a homopolymer from conjugated diene monomers, in the course of preparing a conjugated diene copolymer from conjugated diene monomers, in the course of preparing a vinyl aromatic-conjugated diene copolymer from a vinyl aromatic monomer and a conjugated diene monomer, and in the course of preparing a block copolymer from a vinyl aromatic monomer and a conjugated diene monomer, all in the presence of an organic alkali metal compound as an anionic polymerization initiator, wherein said polymerization is terminated by mixing a phosphate ester and water to a nonpolar hydrocarbon solvent, wherein said phosphate ester is a mixture of mixture 1 and mixture 2, wherein said mixture 1 is mixture of the compound represented by the formula (1) and the compound represented by the formula (2), and said mixture 2 is a mixture of the compound represented by the formula (3) and the compound represented by the formula (4):

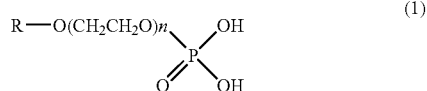

(1)

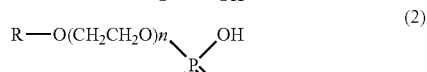

(2)

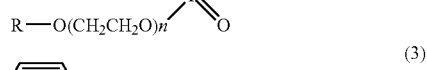

(3)

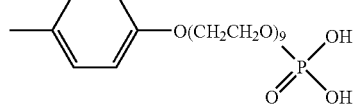

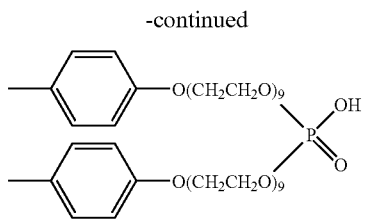
(4)

wherein R is a hydrogen atom or a $C_1$-$C_{20}$ alkyl and n is the number of repeating units of the ion enclosed within parentheses.

2. The method for terminating anionic polymerization according to claim 1, wherein said organic alkali metal compound is an organic lithium compound.

3. The method for terminating anionic polymerization according to claim 1, wherein said conjugated diene monomer is at least one selected from the group consisting of 1,3-butadiene, isoprene, piperylene, methylpentadiene, phenylbutadiene, 3,4-dimethyl-1,3-hexadiene and 4,5-diethyl-1,3-octadiene.

4. The method for terminating anionic polymerization according to claim 2, wherein said vinyl aromatic monomer is at least one selected from the group consisting of styrene, a-methylstyrene, o-methylstyrene, p-methylstyrene, p-t-butylstyrene and 1,3-dimethylstyrene.

5. The method for terminating anionic polymerization according to claim 1, wherein said phosphate ester/water mixture has a mixing ratio of 1:0.1-10 based on weight.

6. The method for terminating anionic polymerization according to claim 1, wherein said phosphate ester mixture 1 and said phosphate ester mixture 2 are mixed in a mixing ratio of 1:0.1-10 based on weight.

7. The method for terminating anionic polymerization according to claim 1, wherein said nonpolar hydrocarbon solvent is at least one selected from the group consisting of cyclopentane, cyclohexane, cycloheptane, branched cyclic aliphatic hydrocarbon solvents, benzene, naphthalene, toluene, xylene, alkyl-substituted aromatic hydrocarbon solvents, pentane, hexane, heptane, octane and linear or branched aliphatic hydrocarbon solvents.

8. The method for terminating anionic polymerization according to claim 1, wherein said phosphate ester mixture 1 and said phosphate ester mixture 2 respectively have an acid value of 1.2-1.9.

9. The method for terminating anionic polymerization according to claim 1, wherein said polymerization terminator is added in an amount of 0.5-20 equivalents based on the moles of the organic alkali metal compound used as a polymerization initiator.

* * * * *